United States Patent
Min

(10) Patent No.: US 6,725,065 B2
(45) Date of Patent: Apr. 20, 2004

(54) ALERTING DEVICE FOR NOTIFYING INCOMING CALL BY USING EARPHONE JACK IN PORTABLE MOBILE PHONE

(75) Inventor: Jung-Gi Min, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 663 days.

(21) Appl. No.: 09/746,993

(22) Filed: Dec. 20, 2000

(65) Prior Publication Data

US 2002/0032046 A1 Mar. 14, 2002

(30) Foreign Application Priority Data

Sep. 8, 2000 (KR) .................................... P2000-53525

(51) Int. Cl.$^7$ ................................................ H04B 1/38
(52) U.S. Cl. .................... 455/567; 455/575.2; 379/430
(58) Field of Search ................................ 455/550.1, 567, 455/575.1, 575.2; 379/423, 424, 430

(56) References Cited

U.S. PATENT DOCUMENTS

| 6,266,542 | B1 | * | 7/2001 | Stern et al. | ............... | 455/569.1 |
| 6,490,463 | B1 | * | 12/2002 | Portalier et al. | ............ | 455/557 |
| 6,519,475 | B1 | * | 2/2003 | Kim | ............................. | 455/557 |
| 6,564,072 | B1 | * | 5/2003 | Attimont et al. | .......... | 455/569.1 |

FOREIGN PATENT DOCUMENTS

| DE | G9104788.9 | 7/1991 |
| DE | 4022959 A1 | 1/1992 |
| DE | 29608797 U1 | 8/1996 |
| DE | 19644667 A1 | 10/1996 |

* cited by examiner

*Primary Examiner*—Nguyen T. Vo
*Assistant Examiner*—Nhan T. Le
(74) *Attorney, Agent, or Firm*—Dilworth & Barrese LLP

(57) ABSTRACT

Disclosed is an alerting device for an incoming call with an earphone jack of a portable mobile phone for notifying a user of an incoming call or an alarm from outside of the portable mobile phone. The alerting device of a portable mobile phone including an earphone jack for connecting an earphone with an earphone operator for operating the earphone includes an external incoming notifying device. The notifying system further includes a discriminator, an incoming notifying operator, a selector and a controller installed in the portable mobile phone. The external incoming notifying device includes at least one incoming notifying element, and an earphone jack connector for connecting the incoming notifying elements to the earphone jack. The discriminator, connected with the earphone jack, determines which device of the earphone and the external incoming notifying device is connected to the earphone jack. The incoming notifying operator operates the external incoming notifying device. The selector connects the earphone operator or the incoming notifying operator to the earphone jack. The controller receives the determination from the discriminator and connects one of the earphone operator and the incoming notifying operator to the earphone jack.

11 Claims, 1 Drawing Sheet

ALERTING DEVICE FOR NOTIFYING INCOMING CALL BY USING EARPHONE JACK IN PORTABLE MOBILE PHONE

PRIORITY

This application claims priority to an application entitled "Alerting Device for Notifying Incoming Call by Using Ear Jack in Portable Mobile Phone" filed with the Korean Industrial Property Office on Sep. 8, 2000 and assigned Ser. No. 2000-53525, the contents of which is hereby incorporated by reference.

BACKGROUND OF THE INVENTION

1. Field of the Invention

The present invention relates generally to a portable mobile phone, and in particular, to an alerting device for notifying a user of an incoming call or an alarm.

2. Description of the Related Art

In general, a portable mobile phone notifies a user of an incoming call by sound, vibration or light. A user is also notified of an alarm in the form of a sound, a vibration or of a light. However, the sound of an incoming call can scarcely be recognized if the user has poor hearing or is in a noisy surrounding. Further, if the phone is in a pocket or in a bag of the user, an incoming call or an alarm can hardly be recognized by sound, vibration or light.

In an attempt to solve the above problems, a technology has been suggested to output an incoming call sound through an external earphone connected to portable mobile phone. According to this technology, a user is able to listen to the sound of an incoming call through an external earphone even if the user is in a noisy surrounding or has poor hearing, or even in the case when the phone is in a bag or in a pocket.

However, with the existing technology, it is impossible to use external vibration or light to notify the user.

SUMMARY OF THE INVENTION

It is, therefore, an object of the present invention to provide a system for notifying a user of an incoming call or an alarm from the outside of a portable mobile phone by using a standard earphone jack.

To achieve the above object, there is provided a system for notifying a user of an incoming call of a portable mobile phone according to the present invention. The system of a portable mobile phone having an earphone jack for connecting an earphone and an earphone operator for operating the earphone, includes an external incoming notifying system. The system further includes a discriminator, an incoming notifying operator, a selector and a controller installed in the portable mobile phone. The external incoming notifying system has at least one incoming notifying element and an earphone jack connector for connecting the incoming notifying elements to the earphone jack of the portable phone. The discriminator, connected to the earphone jack, determines which device of the earphone and the external incoming notifying system is connected to the earphone jack. The incoming notifying operator operates the external incoming notifying system. The selector connects the earphone operator or the incoming notifying operator to the earphone jack. The controller receives the determination of the discriminator connects one of the earphone operator ad the receiving notifying operator to the earphone jack.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
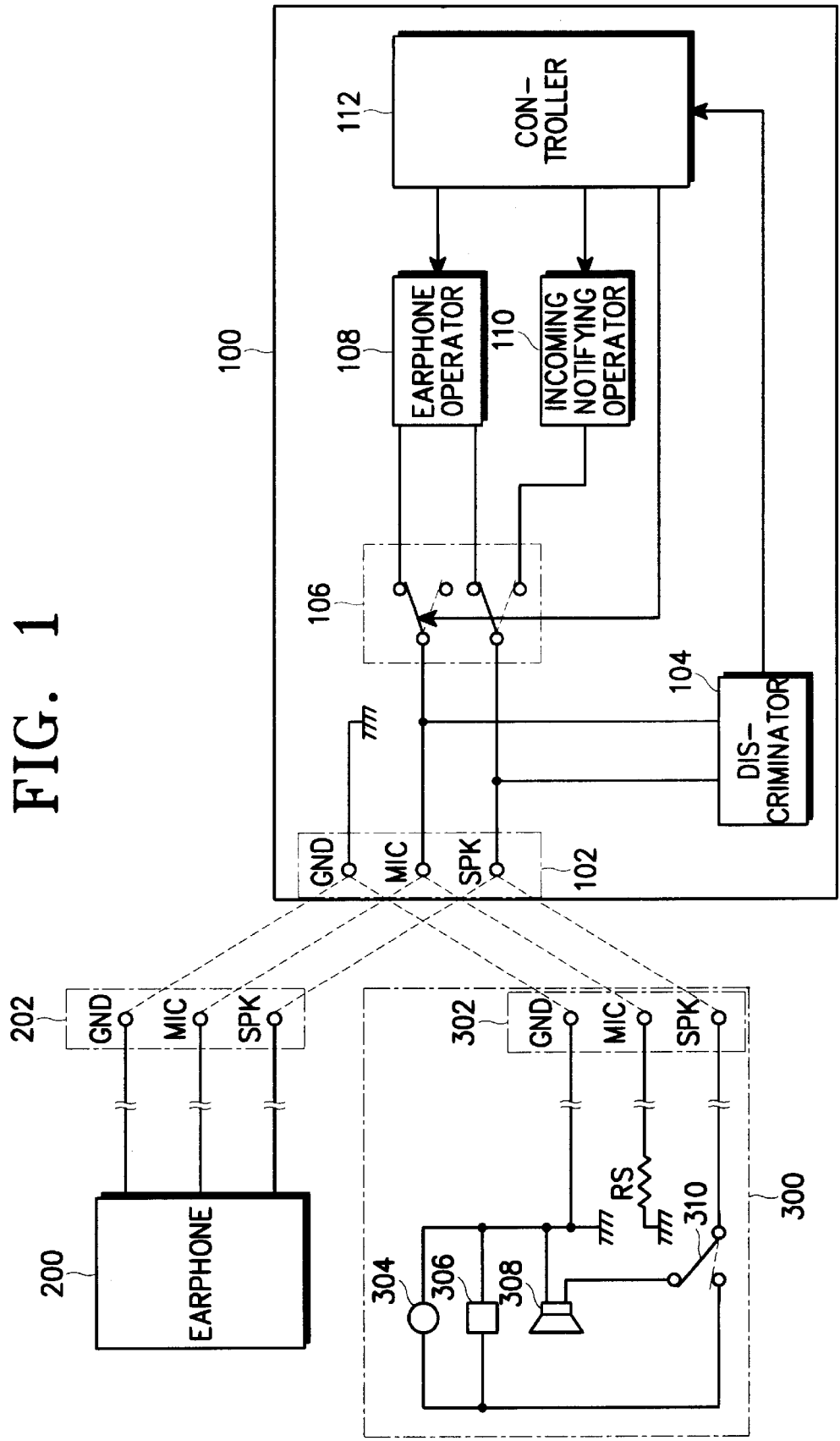
FIG. 1 is a diagram illustrating a construction of an incoming notifying system for an incoming call with an earphone jack according to an embodiment of the present invention.

A preferred embodiment of the present invention will be described herein below with reference to the accompanying drawings. In the following description, well-known functions or constructions are not described in detail since they would obscure the invention in unnecessary detail.

FIG. 1 is a diagram illustrating a construction of an incoming notifying system for an incoming call with an earphone jack according to an embodiment of the present invention. Referring to FIG. 1, a portable mobile phone 100 includes a conventional standard earphone jack 102 for connecting a conventional earphone 200, an earphone operator 108 for operating the earphone 200, an incoming notifying operator 110 for operating an incoming notifying element, and a controller 112. The phone 100 further includes a discriminator 104 and a selector 106 according to an embodiment of the present invention. Further, an external incoming notifying device 300 according to the present invention, includes an earphone jack connector 302, at least one incoming notifying element (i.e., a lamp 304, a vibration motor 306, a buzzer 308) a switch 310, and a resistance unit RS as a sensor element. The earphone jack connector 302 includes a ground terminal GND, a microphone terminal MIC, and a speaker terminal SPK for connecting to the earphone jack 102 of the portable mobile phone 100. The lamp 304, the vibration motor 306 and the buzzer 308 are connected between the speaker terminal SPK and the ground terminal GND through the switch 310, and the microphone terminal MIC is grounded through the resistance unit RS. The switch 310 connects the lamp 304, the vibration motor 306 or the buzzer 308 with the speaker terminal SPK of the earphone jack connector 302. The switch 310 connects the lamp 304 or the vibration motor 306 to the speaker terminal SPK of the earphone jack connector 302 by manipulation of a user who does not desire a sound signal of a notification. However, if the user desires a sound signal of notification, the buzzer 308 is connected to the speaker terminal SPK of the earphone jack connector 302.

The discriminator 104, connected with the microphone terminal MIC and the speaker terminal SPK of the earphone jack 102, determines which device of the earphone 200 and the external incoming notifying device 300 is connected to the earphone jack 102. The discriminator 104 detects and determines whether the earphone connector 202 of the earphone 200 is connected to the earphone jack 102 as in case of the conventional art. On the other hand, when the external incoming notifying device 300 rather than the earphone 200 is connected to the earphone jack 102, the microphone terminal MIC of the earphone jack 102 is grounded through the resistance unit RS connected to the microphone terminal MIC of the earphone jack connector 302. Then, the discriminator 104 detects and determines whether or not the external incoming notifying device 300 is connected.

The selector 106, connected between the microphone terminal MIC, the speaker terminal SPK of the earphone jack 102, the earphone operator 108 and the incoming notifying operator 110, connects the earphone operator 108 or the incoming notifying operator 110 to the earphone jack 102.

The controller 112, connected to the discriminator 104, the selector 106, the earphone operator 108 and the incoming notifying operator 110, receives the determination from the discriminator and controls the selector 106 so as to connect one of the earphone operator and the incoming notifying operator to the earphone jack 102, and operate the same.

If the earphone 200 is connected to the earphone jack 102, the earphone 200 is normally used as in the conventional art. If the external incoming notifying device 300 is connected to the earphone jack 102, the device notifies a user of an incoming call or an alarm by sound, light or vibration. The combinations thereof are only limited by the amount of switches in the device and are not meant to be exclusive as any notifying devices can be incorporated herein without departing from the scope and spirit of the present invention.

It is possible to notify a user of an incoming call or an alarm from outside of the portable mobile phone 100, using the conventional earphone jack, by making use of the external incoming notifying device 300 including the same earphone jack connector 302 as the standard earphone jack 102 of the portable mobile phone 100.

As described above, the alerting device for notifying an incoming call according to the present invention provides advantages of notifying a user of an incoming call and an alarm from outside of the portable mobile phone and, at the same time, using the conventional earphone jack, by making use of the external incoming notifying device including the same earphone jack connector as the standard earphone jack of a portable mobile phone. The kinds of incoming notifying elements of the external incoming notifying device 300 may be varied. Further, it is possible to operate the lamp 304, the vibration motor 306 and the buzzer 308 together without actuating the switch 310, or adjust these elements in another structure from the structure shown in FIG. 1.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for notifying a user of an incoming call of a portable mobile phone having an earphone jack for connecting with an earphone and an earphone operator for operating the earphone, the system comprising:

an external incoming call notifying device including at least one incoming notifying element and an earphone jack connector for connecting the at least one incoming notifying element to the earphone jack;

a discriminator contained in the portable mobile phone for determining if one of the earphone and the external incoming call notifying device is connected to the earphone jack;

an incoming call notifying operator, placed in the portable mobile phone, for operating the external incoming call notifying device;

a selector contained in the portable mobile phone for selectively connecting the earphone operator or the incoming notifying operator with the earphone jack; and a controller contained in the portable mobile phone for receiving the determination of the discriminator, and connecting one of the earphone operator and the incoming notifying operator to the earphone jack.

2. The system as claimed in claim 1, wherein the earphone jack and the earphone jack connector each comprises a ground terminal, a microphone terminal and a speaker terminal.

3. The system as claimed in claim 2, wherein the external incoming call notifying device comprises a sensor element connected to the microphone of the earphone jack connector for providing an incoming notifying device signal to the discriminator.

4. The system as claimed in claim 3, wherein the sensor element is a resistance element connected between the microphone terminal and the ground terminal.

5. The system as claimed in claim 2, wherein the incoming call notifying element is connected between the speaker terminal and the ground terminal.

6. A system for notifying a user of an incoming call of a portable mobile phone having an earphone jack for connecting with an earphone and an earphone operator for operating the earphone, the system comprising:

an external incoming call notifying device including a plurality of incoming call notifying elements, an earphone jack connector for connecting the incoming call notifying elements to the earphone jack, and a switch for selectively connecting the incoming call notifying elements to the earphone jack connector;

a discriminator contained in the portable mobile phone connected with the earphone jack, for determining one of the earphone and the external incoming call notifying device is connected to the earphone jack;

an incoming call notifying operator contained in the portable mobile phone for operating the external incoming call notifying device;

a selector contained in the portable mobile phone for connecting one of the earphone operator and the incoming call notifying operator with the earphone jack; and a controller contained in the portable mobile phone for receiving the determination of the discriminator, and connecting one of the earphone operator and the incoming call notifying operator to the earphone jack.

7. The system as claimed in claim 6, wherein the earphone jack and the earphone jack connector each comprises a ground terminal, a microphone terminal and a speaker terminal.

8. The system as claimed in claim 7, wherein the external incoming call notifying device comprises a sensor element connected to the microphone terminal of the earphone jack connector for providing an incoming call notifying device signal to the discriminator.

9. The system as claimed in claim 8, wherein the sensor element is a resistance element connected between the microphone terminal and the ground terminal.

10. The system as claimed in claim 6, wherein the incoming call notifying elements are connected between the speaker terminal and the ground terminal through the switch.

11. The system as claimed in claim 10, wherein the incoming call notifying elements include one or more of a lamp, a vibration motor and a buzzer.

* * * * *